United States Patent [19]

Epperson et al.

[11] Patent Number: 5,754,771

[45] Date of Patent: May 19, 1998

[54] MAXIMUM RECEIVE CAPACITY SPECIFYING QUERY PROCESSING CLIENT/SERVER SYSTEM REPLYING UP TO THE CAPACITY AND SENDING THE REMAINDER UPON SUBSEQUENT REQUEST

[75] Inventors: Dirk Epperson; David W. Van Couvering, both of Berkeley, Calif.

[73] Assignee: Sybase, Inc., Emeryville, Calif.

[21] Appl. No.: 598,594

[22] Filed: Feb. 12, 1996

[51] Int. Cl.$^6$ .................................................. G06F 15/16
[52] U.S. Cl. .................. 395/200.33; 348/10; 395/200.49; 395/853
[58] Field of Search ............................ 348/7, 10; 370/235, 370/236; 395/200.13, 200.09, 849, 853, 854, 200.33, 200.49

[56] References Cited

U.S. PATENT DOCUMENTS

| | | | |
|---|---|---|---|
| 4,736,369 | 4/1988 | Barzilai et al. | 370/231 |
| 5,507,005 | 4/1996 | Kojima et al. | 395/872 |
| 5,517,622 | 5/1996 | Ivanoff et al. | 395/200.13 |
| 5,623,607 | 4/1997 | Kodama et al. | 395/250 |

OTHER PUBLICATIONS

Furht, B., Kalra, D., Kitson, F., Rodriguez, A. and Wall, W., *Design Issues for Interactive Television Systems*, Computer, May 1995, pp. 25–39.

Primary Examiner—Kenneth S. Kim
Attorney, Agent, or Firm—John A. Smart

[57] ABSTRACT

An Interactive Television (ITV) Client/Server system comprises one or more Clients (e.g., set top boxes or "STBs") connected to a Server module, via a Broadband Communication Network, is described. The system provides a generic mechanism for deciding how much or how little data is to be sent in response to a request from a Client. Specifically, each Client is allowed to describe ahead of time how much memory (approximately or exactly) it is allowing for the query result. This is communicated by the Client as part of the query itself. Regardless of what other activity the Client undertakes, the server maintains the context of the original query, until the Client terminates the connection. In a similar manner, when other simultaneous queries are open, the context is maintained for each query until the connection is dropped (or the query terminates). The Client can ask for more data (i.e., rows) on any open query. To optimize operation of the environment, requests from the Clients (i.e., queries) are de-multiplexed down to a set of worker threads, available at the server, which carry out the actual work of query processing. Because of this approach, a request for more data from a Client (i.e., set top box) can "land" on any worker thread. This gives queries the ability to "jump" from one thread of execution to another. In this manner, a finite number of threads may be employed to service a large query pool, with maximum throughput.

30 Claims, 8 Drawing Sheets

MAXIMUM RECEIVE CAPACITY SPECIFYING QUERY PROCESSING CLIENT/SERVER SYSTEM REPLYING UP TO THE CAPACITY AND SENDING THE REMAINDER UPON SUBSEQUENT REQUEST

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to systems and methods for processing requests for access to data in environments having one or more clients connected to a host (or set of hosts) and, more particularly, to those environments characterized by broadband communication networks, such as Interactive Television (ITV) environments, having set top box clients connected to one or more servers.

Figure 1:
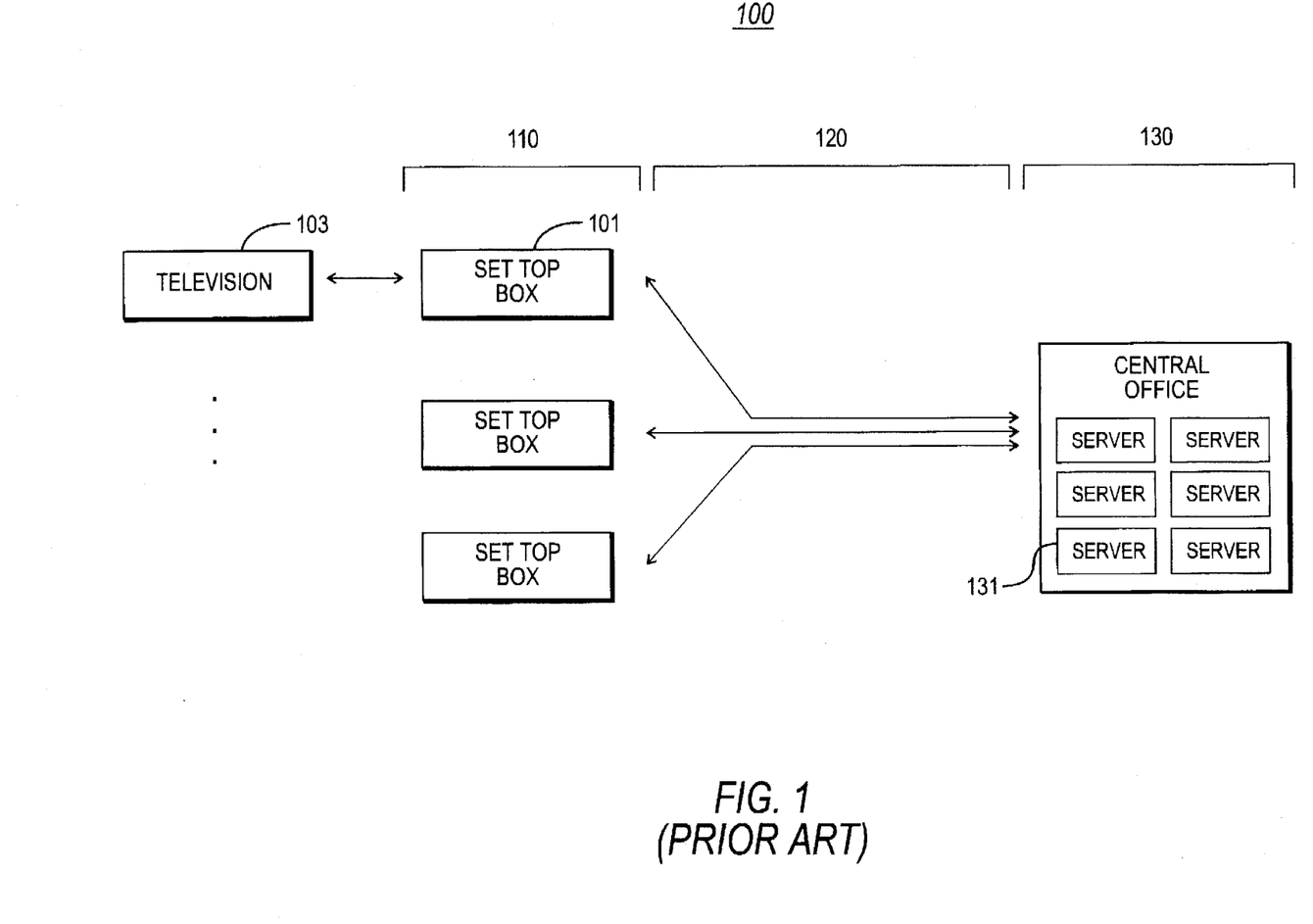
FIG. 1 is a block diagram illustrating basic components of an Interactive Television (ITV) system.

ITV environments are typified by set top boxes, at individual customer sites (e.g., consumer home), connected via a broadband network to a central office. Such an environment is illustrated in FIG. 1 as Interactive Television (ITV) environment 100. The environment 100 includes a multitude of set top boxes (STBs) 110, such as set top box 101, connected via a high-bandwidth communication medium 120 (e.g., coax, fiber optic, and the like) to a central office 130. Each set top box itself is generally a small, economically-produced consumer unit which sets atop a television. Communication between the set top box and the central office is bidirectional. In general operation, the set top box 101 interacts with a television, such as television 103. Through the set top box 101, the central office 130 can send streams of objects to customers, such as streams of video, pictures, audio, text, and other information, all upon specific requests by the customers.

The set top box itself is a microcomputer, which includes common microcomputer components, such as a microprocessor (e.g., Intel 486) and memory (e.g., random-access memory or "RAM"). Since set top boxes are generally geared to the mass consumer market, they must be produced economically. Accordingly, memory in such boxes is typically constrained, relative to what one would find in a desktop computer. Commonly, memory for set top boxes ranges from about two megabytes to about six megabytes of RAM. Also for purposes of economy, set top boxes generally do not include disk storage subsystems; instead, the set top boxes are entirely RAM and/or ROM (read-only memory) units. Since these units do not contain a disk, they have no concept of virtual memory management—that is, extending physical memory (e.g., available RAM) by swapping out pages (i.e., 2K memory blocks) of code and/or data to a disk subsystem.

At the central office, one or more server computers (e.g., server 131) are employed for servicing the requests of each particular set top box. In particular, the servers "serve" information to the set top boxes, including information about the kind of services and features (e.g., videos) that the customer or user can receive on his or her TV. Services which the user might receive include, for instance, a travel service, a weather service, a home shopping service, a video rental service, and the like. To actually display those services to a user, a set top box typically first submits a query to the central office, requesting data about a service. For a video-on-demand service, for example, a typical query might request a list of all "Westerns" available from that service. Here, in response to input initiating such a request from the user, the set top box formulates a query (either SQL or non-SQL). In response to the query, a server from the central office will return an answer set back to the set top box, ultimately for presentation to the customer.

A potential problem exists, however. The set top box does not know beforehand how much information the query will return (i.e., how large is the answer set). For the example of Western movies, for instance, the set top box does not know beforehand how large the list of Western movies will be, when it is returned by the server. The number of Westerns available might be small, say only five movies for the service. On the other hand, it might be quite large, say 5,000 or more. If in fact the number is 5,000, the set top box does not have sufficient room—available memory—for holding such a large list. Accordingly, a mechanism is required which allows the set top box to browse through a list of arbitrary size, yet within the confines of a system where the client (i.e., set top box) is memory constrained.

One approach to the foregoing problem is to implement a protocol which returns a fixed number of items for a query. For example, it is relatively simple to implement a protocol which would return the first 100 items. Although that approach might yield acceptable results for a video-on-demand system, the approach is, in general, one of limiting scope and flexibility. Consider an application of an ITV system where business customers employ browsers which interact with a video-processor for browsing through large sets of meta-data, looking for a particular video clip which is desired. An approach which arbitrarily truncates a set is, in this instance, undesirable.

Further, the server, in this example, does not know exactly what are the particular limitations of each of the many set top boxes which it must service. From one set top box to another, for instance, the amount of available memory might vary widely. An approach which would return a fixed number of items, regardless of the capabilities of the receiving STB, would be suboptimal, at best.

What is needed are systems with methods for providing access to data, particularly in broadband environments, in a manner which does not set hard limits on answer sets. The present invention fulfills this and other needs.

SUMMARY OF THE INVENTION

An Interactive Television (ITV) Client/Server system of the present invention comprises one or more set top boxes (STBs) connected to a Server module, via a Broadband Communication Network. The Server module comprises a plurality of servers, including a Dispatch Server having a Server API (Application Programming Interface), an Intermedia Server (Sybase SQL Server), and a Video Processor/Media Stream Server. Data for the Intermedia Server is stored in Table(s). The Video Processor, which may comprise an available third party media server, provides information content under control of the Dispatch Server. In a preferred embodiment, Video Processor is a Hewlett-Packard VTE Media Stream Server, available from Hewlett-Packard of Palo Alto, Calif. The Video Processor serves as a means for storing video content which is provided to Clients (set top boxes) under control of the Dispatch Server. Each of the Clients operates under control of one or more applications developed in conjunction with the Application Programming Interface (API) for communicating with the Servers. In a preferred embodiment, the Interface for communicating with the Servers comprises Sybase® Open Server™ interface, which is linked into the Dispatch Server. The Interface provides entry points (e.g., named functions) which Clients can call into for requesting services from the Servers.

The system provides a generic mechanism for deciding how much or how little data is to be sent in response to a request from a Client. Specifically, each Client is allowed to describe ahead of time how much memory (approximately or exactly) it is allowing for the query result. This can be specified, for instance, as a number of bytes or, more preferably, in terms of a number of rows (typically, ranging from about 25 rows to about 300 rows). In a preferred embodiment, this is communicated by the Client as part of the query itself. If the result is less than or equal to a client request of, say, 100 rows, that result is returned and the query is done. If, on the other hand, more than 100 rows exist in the result, the first 100 rows is returned to the Client. The Client is now free to do other things, such as open another simultaneous query.

Regardless of what other activity the Client undertakes, the server maintains the context of the original query, until the Client terminates the connection. In a similar manner, when other simultaneous queries are open, the context is maintained for each query until the connection is dropped (or the query terminates). The Client can ask for more rows on any open query. Additionally, the Client can alter the number of rows (to be fetched next) on-the-fly for any open query, for example, changing the initial request of 100 rows to 50 rows. At any time, the Client can "cancer" a query—dropping the query.

The approach adopted in a preferred embodiment is server-centric. Specifically, the Client need not keep any context information around for any query. Instead, the Client simply keeps a single handle (e.g., integer) which describes a particular query; in an exemplary embodiment, the Client passes a handle when it first opens a query. In this manner, the Client need not maintain local data structures describing the query, nor need the Client keep an open thread for the query. In an asynchronous fashion, the Client can open one or more queries, each remaining open for an arbitrary period of time (e.g., while the user watches a video). Then, processing of each query can continue at some arbitrary point in the future. This is maintained at the server as a unique handle within the context of that particular Client.

To optimize operation of the environment, requests from the Clients (i.e., queries) are de-multiplexed down to a set of worker threads, available at the server, which carry out the actual work of query processing. In accordance with the present invention, the multiplexing approach is adopted since, although the system may service a large number of Clients (e.g., 10,000 set top boxes), at any given time, relatively few Clients are making active requests which need to be serviced. In this manner, therefore, the worker threads can confine their activities to picking up and servicing active queries.

Because of the multiplexing of requests among worker threads, a request for more data from a Client (i.e., set top box) can "land" on any worker thread in an asynchronous fashion. Queries include the ability to "jump" from one thread of execution to another. Since a finite number of threads are available for servicing the queries, worker threads are not put to "sleep" while awaiting a "fetch next" command from a particular Client. Instead of sleeping, each worker thread, after it has completed processing on its current query, simply begins processing the next available query. A thread processing a "fetch next" command from a particular Client may, in fact, be a different thread than that employed for processing the previous fetch command of that Client. In this manner, a finite number of threads may be employed to service a large query pool in an asynchronous manner, with maximum throughput.

In a preferred embodiment, a pool of worker threads is maintained. When work is required to service a request for the "next" set of rows, the work can be passed off to one of the worker threads. In other words, the system maintains many worker threads and each time a new request comes in, it is passed off to one of the worker threads. Since query context is maintained for each query, a given query can "jump" or "hop" among different worker threads.

BRIEF DESCRIPTION OF THE DRAWINGS

FIGS. 3A and 3B are block diagrams each illustrating multimedia Client/Server systems in which the present invention can be embodied.

DETAILED DESCRIPTION OF A PREFERRED EMBODIMENT

System environment

A. General

Figure 2:
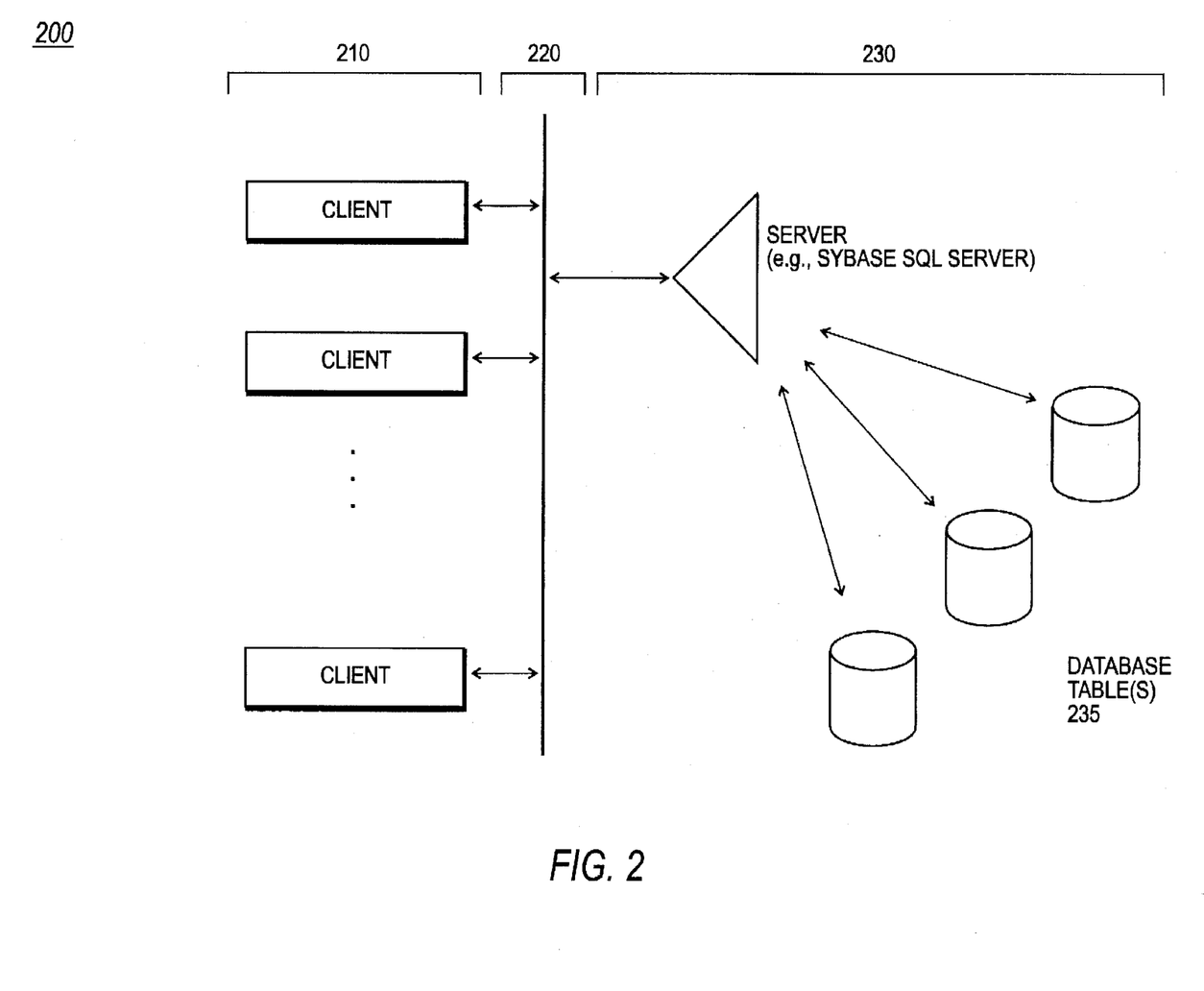
FIG. 2 is a block diagram illustrating basic components of a Client/Server system in which the present invention may be embodied.

The present invention may be implemented in those environments which provides a "Host," such as a "Server," connected to at least one "Client," such as the system 200 of FIG. 2. Generally, such a "Client/Server" environment is characterized by a multitude of Clients 210 connected to via a Broadband Communication Network 220 to one or more Servers 230. The Server(s), operating under a server operating system (e.g., UNIX), includes a Database Server System. In general operation, Clients store data in and retrieve data from one or more database tables 235 resident on the Server by submitting SQL commands, some of which specify "queries"—criteria for selecting particular records of a table. Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see *METHOD AND SYSTEM FOR OPPORTUNISTIC LOCKING IN A NETWORKED COMPUTER SYSTEM*, Intl. Application No. PCT/US90/04570, Intl. Publication No. WO 91/03024, Intl. Publication Date Mar. 7, 1991. For a general introduction to use of a network, such as a Local Area Network (LAN) operating under NetWare, see Freed, L. et al., *PC Magazine Guide to Using NetWare*, Ziff-Davis Press, 1991. A more detailed discussion of NetWare networks is available in NetWare 3.x and 4.x and accompanying documentation, which is available from Novell of Provo, Utah. The disclosures of each of the foregoing are hereby incorporated by reference.

Figure 3A:
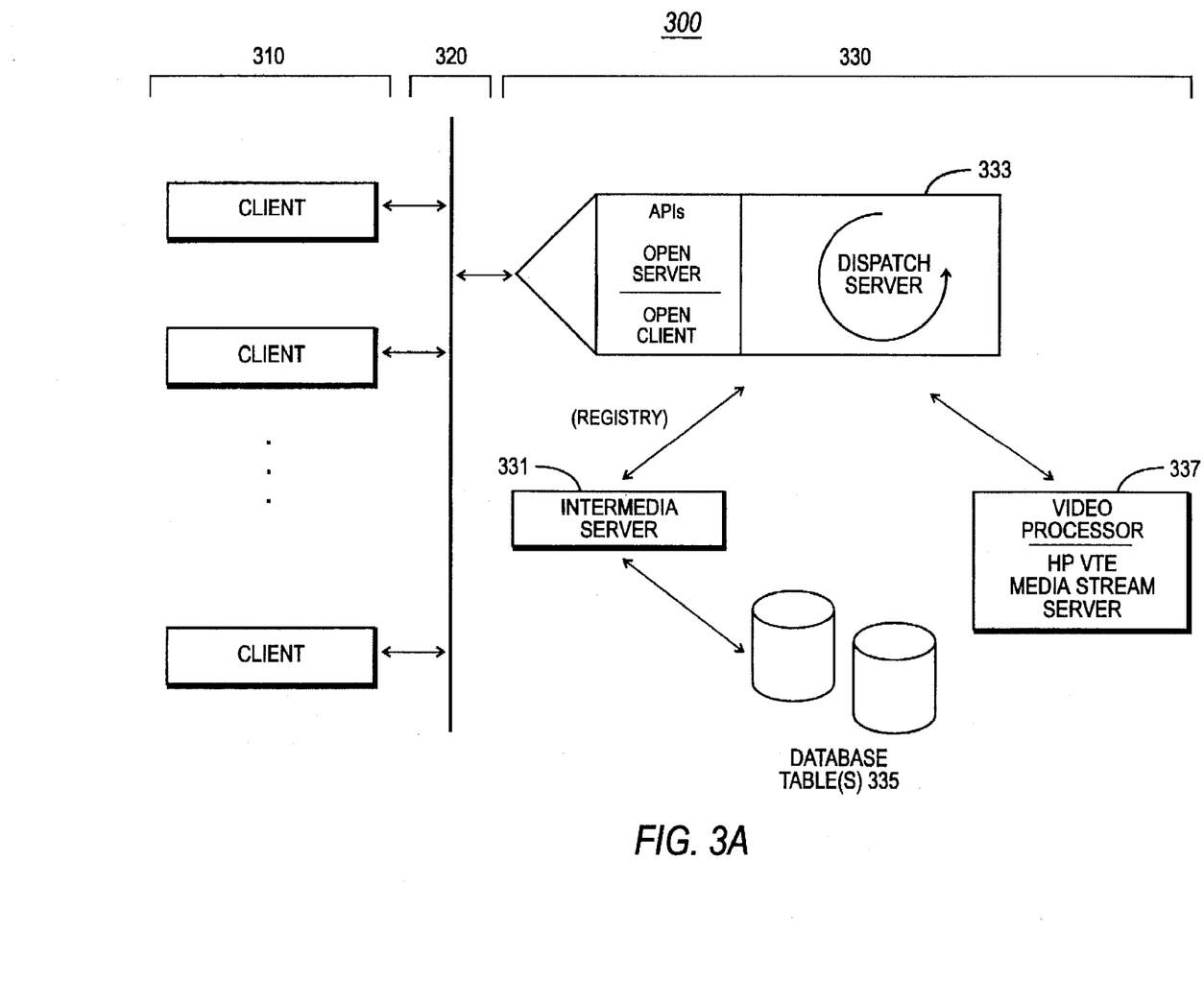
Figure 3B:
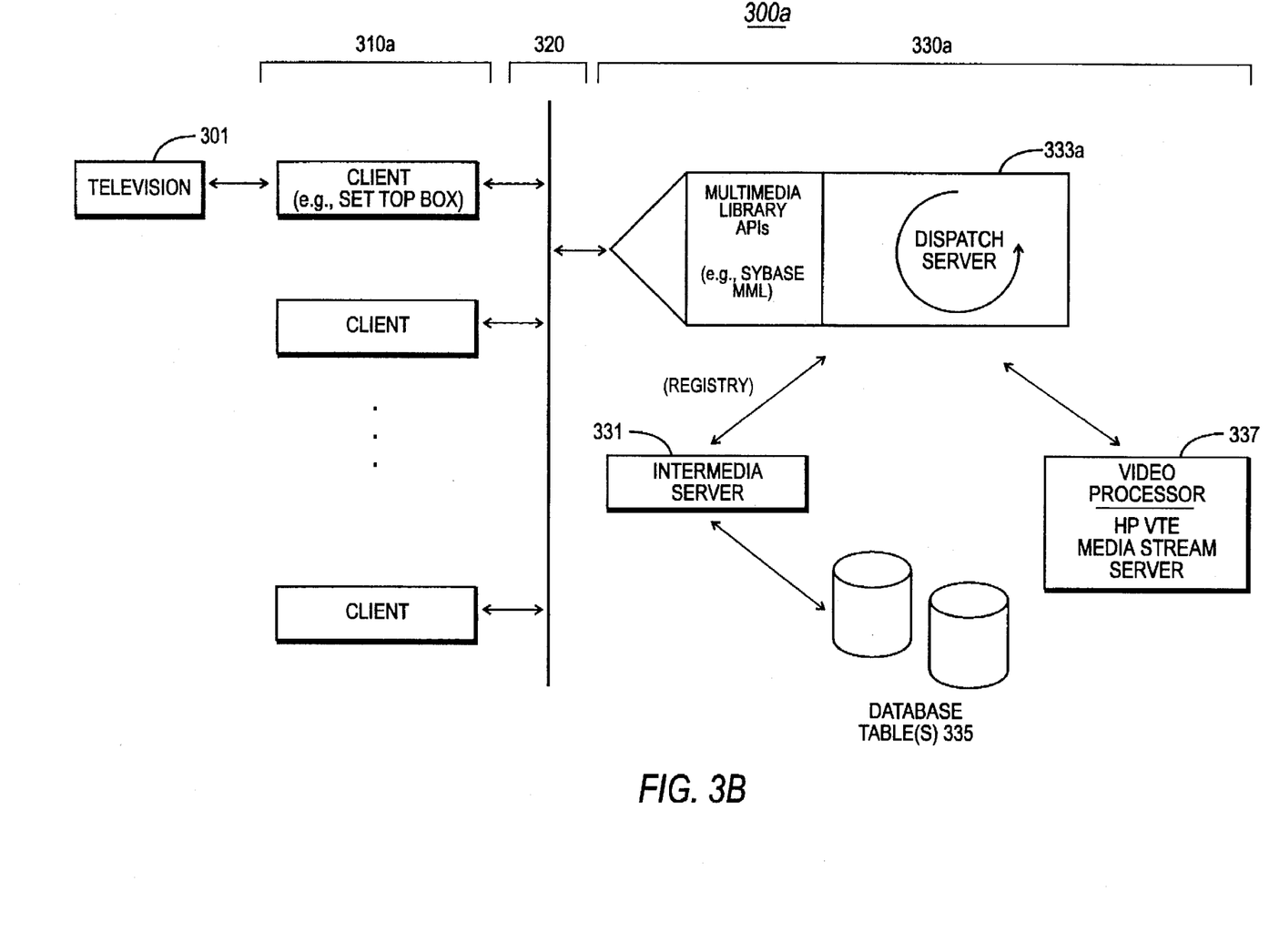
FIG. 3B is an Interactive Television (ITV) Client/Server system employed in a preferred embodiment.

FIGS. 3A and 3B are block diagrams illustrating multimedia Client/Server systems in which the present invention can be embodied. The system 300 comprises one or more clients 310 connected to a Server module 330, via a Broadband Communication Network 320. Server module 330 comprises a plurality of servers, including a Dispatch Server 333 linked into an Open Server/Open Client API (Application Programming Interface) 332, an Intermedia Server (Sybase SQL Server) 331, and a Video Processor/Media Stream Server 337. Data for the Intermedia Server is stored in Table(s) 335. The Video Processor 337, which may comprise an available third party media server, provides information content (e.g., multimedia) under control of the Dispatch Server 333. In a preferred embodiment, Video Processor 337 is a Hewlett-Packard VTE Media Stream Server, available from Hewlett-Packard of Palo Alto, Calif. The Video Processor 337 serves as a means for storing video content which is provided to Clients (set top boxes) under control of the Dispatch Server 333.

Each of the Clients 310 operates under control of one or more applications developed in conjunction with the Application Programming Interface (API) 332 for communicating with the Servers. In the embodiment of FIG. 3A, the Interface 332 for communicating with the Servers comprises Sybase® Open Server™/Open Client™ interface (which is described further in originally-filed Appendix B, now canceled for convenience of patent publication). The Interface provides entry points (e.g., named functions) which Clients can call into for requesting services from the Servers.

On the Server side, a core services library exists which includes the actual implementation for servicing the Client requests. The library includes functionality for receiving queries and returning rows back, for instance. Further, the library includes support for handling multiple threads of execution. In the embodiment of FIG. 2, the actual library functionality for servicing the Application Programming Interface (API) is provided as part of the Database Server itself (e.g., SQL Server™). For the embodiment of FIG. 3A, the runtime library is actually broken out as a separate component—that is, separate from the Database Server proper. This allows developers to effectively load other modules into the Open Server, yet preserve the exact same API (from the perspective of the Client). In the implementation of FIG. 3A, the Open Server/Open Client interface is in communication with the Dispatch Server, so that calls for database (and related) functionality are routed from the interface to the Dispatch Server, for appropriate dispatching within the Server Module.

FIG. 3B illustrates an Interactive Television (ITV) Client/Server system 300a, which is employed in a preferred embodiment. Here, Clients 310a comprises one or more set top boxes (STBs) connected to Server module 330a, via the Broadband Communication Network 320. Server module 330a is essentially identical to Server module 330 except that the Interface has been changed to one which supports multimedia, as shown by Dispatch Server 333a. In a preferred embodiment, the Interface employed is Sybase MML (Multimedia Library), available from Sybase, Inc. of Emeryville, Calif. Each of the STB Clients 310 is typically connected to a television, such as TV 301. Here, the Video Processor 337 serves as a means for storing video content which is provided to Clients (set top boxes) under control of the Dispatch Server 333.

B. Strategies for providing access to data

1. Server-centric, client-specific approach

Existing client/server mechanisms are buffered on both the client and the server, using a "cursor" mechanism. With a cursor mechanism, a client can "fetch" a next row. If the row resides in the client's memory (i.e., cache or buffer), the fetch request can be satisfied locally. Otherwise, the client submits a request to the server to send the required row (or page/block of rows).

In the traditional client/server approach, the buffering mechanism is hidden from the client application. In a preferred embodiment, however, the functionality is surfaced to client (i.e., set top box) applications. Each client knows how much available memory it has and, thus, is in a position to act in an intelligent manner concerning use of such memory. For example, if a particular client knows it has sufficient memory, that client should be able to download an entire (huge) set of data, instead of being forced to limit itself to a small number of rows (e.g., selected by some external management scheme as the lowest common denominator for all STBs). In a preferred embodiment, therefore, control is given to the individual set top boxes, for deciding how much or how little data is to be sent from the server.

Consider a request from a client, such as for a list of movies, which yields a huge answer set, on the order of 100,000 items. Suppose further that the set top box only has room for 100 items. According to the present invention, the set top box is provided with the capability of browsing through the answer set, such as 100 records at a time (for as long as it wants to), yet in a manner which ties up minimal resources at the server side of the system. Moreover, in accordance with the present invention, the set top box or client is given the capability to terminate the browse session—in effect, "closing" the cursor.

The requirements for a cursor in the context of an ITV system is much different than that encountered for a transaction processing database system. For performance reasons, "cursors" provided by the invention herein are simplified when compared with conventional database server cursors. For instance, the cursors employed by the system of the present invention are, in a preferred embodiment, read-only since users will not be changing content stored at the servers (e.g., users will not be changing information stored about John Wayne movies). In this manner, overhead incurred with updatable cursors is avoided. Cursors are also simplified by making them "one way," that is supporting scrolling in only one direction. In this manner, overhead incurred with bi-directional cursors is eliminated. Moreover, one-way cursors correspond well with how ITV users actually fetch information. Those skilled in the art will appreciate, however, that the system can be modified to include bi-directional and/or updatable cursors, particularly in those systems where such cursors can be provided with acceptable performance costs. Thus as an optimization, cursors are simplified to support functionality which is being used by ITV users. On the other hand, multiple simultaneously open cursors for a single client are provided. A user might, for instance, want to browse restaurant information together with hotel information, or actors with movie information, at the same time. All told, cursors are modified in a manner suited for how they are used by the clients or users.

In a preferred embodiment, each client is allowed to describe ahead of time how much memory (approximately or exactly) it is allowing for the query result. This can be specified, for instance, as a number of bytes or, more preferably, in terms of a number of rows. In a preferred embodiment, this is communicated by the client as part of the query itself. If the result is less than or equal to a client request of, say, 100 rows, that result is returned and the query is done. If, on the other hand, more than 100 rows exist in the result, the first 100 rows is returned to the client. The client is now free to do other things, such as open another simultaneous query.

Regardless of what other activity the client undertakes, the server maintains the context of the original query, until the client terminates the connection. In a similar manner, when other simultaneous queries are open, the context is maintained for each query until the connection is dropped (or the query terminates). The client can ask for more rows on any open query. Additionally, the client can alter the number of rows (to be fetched next) on-the-fly for any open query, for example, changing the initial request of 100 rows to 50 rows. At any time, the client can "cancel" a query— dropping the query.

The approach adopted in a preferred embodiment is server-centric. Specifically, the client need not keep any context information around for any query. Instead, the client simply keeps a single handle (e.g., integer) which describes a particular query; in an exemplary embodiment, the client passes a handle when it first opens a query. In this manner, the client need not maintain local data structures describing the query, nor need the client keep an open thread for the query. In an asynchronous fashion, the client can open one or more queries, each remaining open for an arbitrary period of time (e.g., while the user watches a video). Then, processing of each query can continue at some arbitrary point in the future. This is maintained at the server as a unique handle within the context of that particular client.

2. Multiplexing client requests: "worker" threads

Available database servers are adept at handling thousands of clients, but generally not tens of thousands or more clients, as might be encountered in an ITV environment. To optimize operation of the environment, therefore, requests from the clients (i.e., queries) are de-multiplexed down to a set of worker threads, available at the server, which carry out the actual work of query processing. In accordance with the present invention, the multiplexing approach is adopted since, although the system may service a large number of clients (e.g., 10,000 set top boxes), at any given time, relatively few clients are making active requests which need to be serviced. In this manner, therefore, the worker threads can confine their activities to picking up and servicing active queries.

Because of the multiplexing of requests among worker threads, a request for more data from a client (i.e., set top box) can "land" on any worker thread. Therefore, in the system of the present invention, it is desirable to be able to pass queries among worker threads. In other words, queries include the ability to "jump" from one thread of execution to another. Recall that since a finite number of threads are available for servicing the queries, worker threads are not put to "sleep" while awaiting a "fetch next" command from a particular client. Instead of sleeping, each worker thread, after it has completed processing on its current query, simply begins processing the next available query. A thread processing a "fetch next" command from a particular client may, in fact, be a different thread than that employed for processing the previous fetch command of that client. In this manner, a finite number of threads may be employed to service a large query pool, with maximum throughput.

Figure 4A:
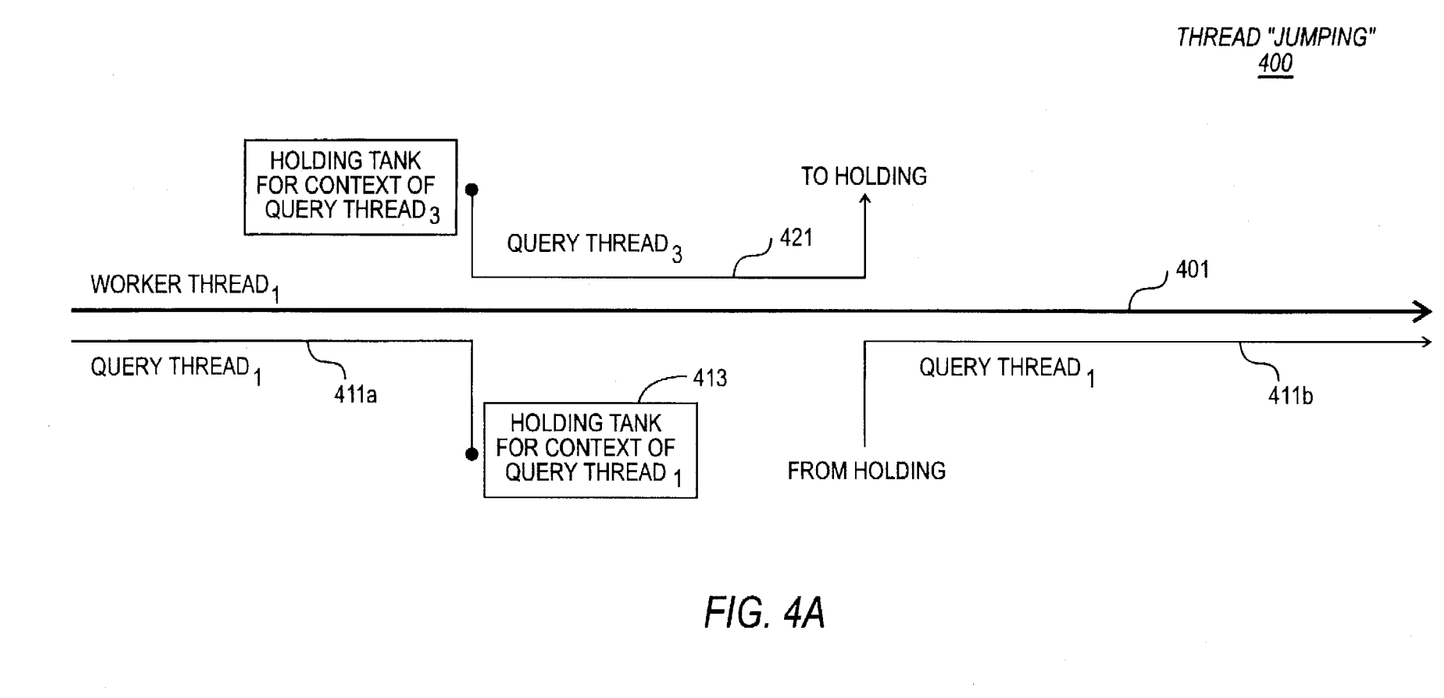
FIGS. 4A and 4B each illustrates a method of the present invention for allowing query processing to "jump" among available worker threads.

FIGS. 4A and 4B illustrate a thread jumping mechanism 400 of the present invention. Initially, worker thread$_1$ (shown at 401 in FIG. 4A) processes query #1; query thread$_1$, shown as 411a, simply serves to hold the context of query #1. In particular, context is stored in a query object for the thread; the object comprises query_id, *connect, and *cmd data members. The query_id data member identifies a particular query from a client. The *connect data member describes a particular connection (i.e., server connection). The *cmd data member describes a query command (e.g., SQL command) together with the current state of that command (i.e., how many rows have been read). After returning a client-specified amount of information to the Client, the query thread$_1$ can be suspended, shown at 413, for holding the context of the query. Worker thread$_1$, on the other hand, continues processing with another query. For instance, the worker thread picks up processing of query #3, whose context is maintained by query thread$_3$, shown at 421. After returning a client-specified amount of information for that query, the worker thread, can switch processing to another query, for example, back to query #1. Here, query thread$_1$ is awakened for context information, as shown at 411b.

Figure 4B:
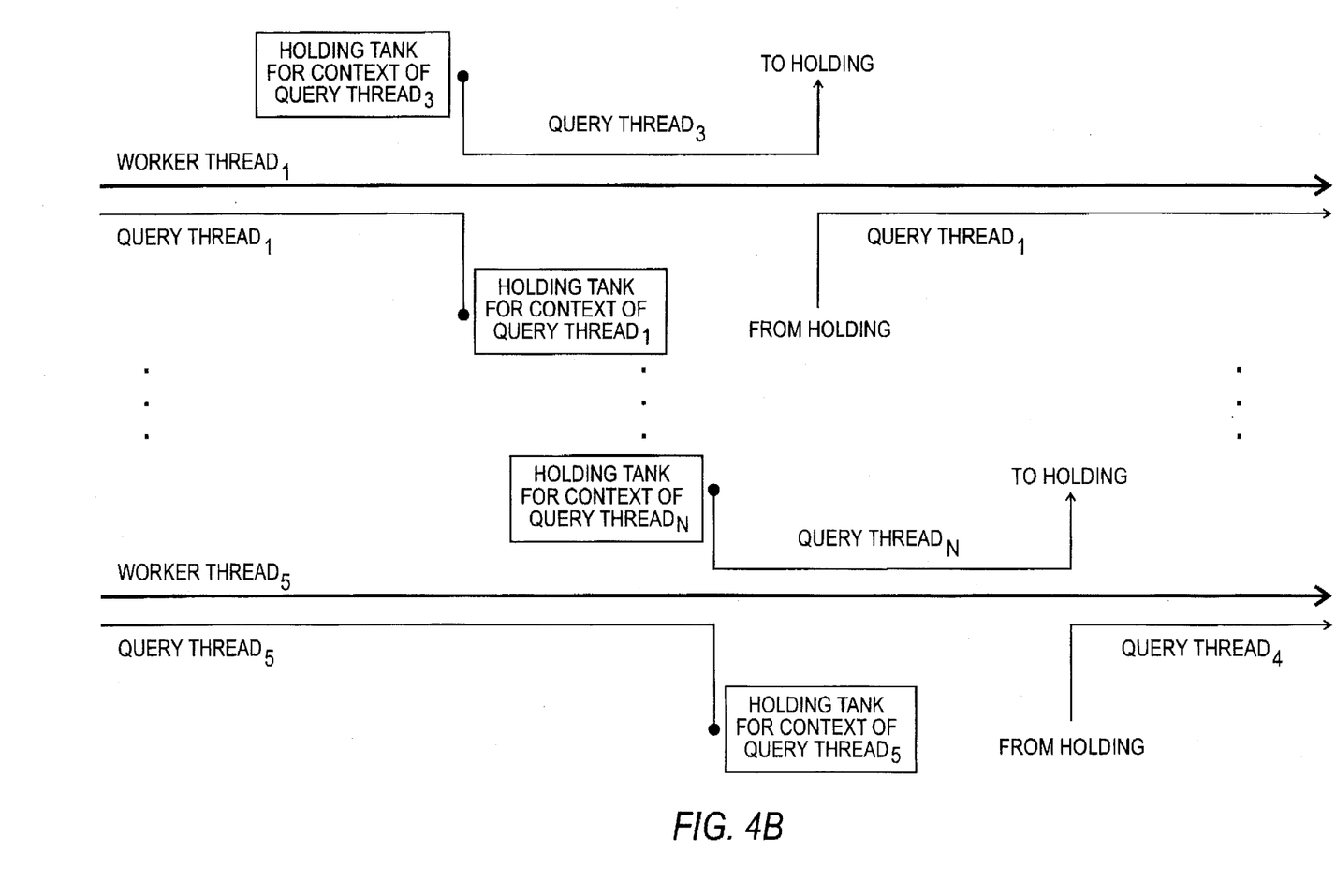

In a preferred embodiment, a pool of worker threads is maintained, as shown in FIG. 4B. When work is required to service a request for the "next" set of rows, the work can be passed off to one of the worker threads. In other words, the system maintains many worker threads and each time a new request comes in it is passed off to one of the worker threads. Since query context is maintained for each query, a given query can "jump" or "hop" among different worker threads.

3. Tracking queries

Given the ability of queries to "jump" threads, a mechanism is provided for coordinating the process. In an exemplary embodiment, each query is uniquely identified by the client ID, instead of thread ID. In this fashion, the client ID can be passed off from one thread of execution to another, for uniquely identifying a particular query which requires processing.

In a preferred embodiment, the system also includes the ability to process multiple result sets. With Sybase Transact-SQL queries, for instance, multiple result sets can occur. A particular problem arises with client requests in the face of multiple result sets. Consider, for instance, a query which yields a result set having three tables and the client requests "fetch next 100 rows." A typical request which yields multiple tables is a query which references a stored procedure (i.e., compiled SQL statements) on the server. The stored procedure itself may, in turn, comprise multiple SQL SELECT statements, each resulting in a particular answer table.

In the system of the present invention, a client request for a particular number of rows is treated as an indicator of how much memory is available at the client. Accordingly, the system returns rows from the multiple tables based on this indication from the client. Suppose the foregoing query yields three result tables: table 1 comprising five rows, table 2 comprising 50 rows, and table 3 comprising 80 rows. In the system of the present invention, the request for the next 100 rows is processed by taking 100 rows total (from the available 135 rows) and returning them to the client. A "fetch next" command would be processed in a similar manner, returning the "next rows" (here, 35 remaining rows).

The mechanism provided herein is generic, supporting a wide variety of clients. In the ITV environment, many diverse clients exist, ranging from travel services, dating services, weather services, to hotel reservation services. In the system of the present invention, the clients can fashion their queries using a standard query language (e.g., SQL) —that is, without having to resort to proprietary commands. In particular, the clients need not be concerned (or even aware of) the multiplexing query processing at the server side. Although the query is processed differently by the server, the differences are not surfaced to the clients.

Construction of a preferred embodiment

A. General method of operation

Figure 5:
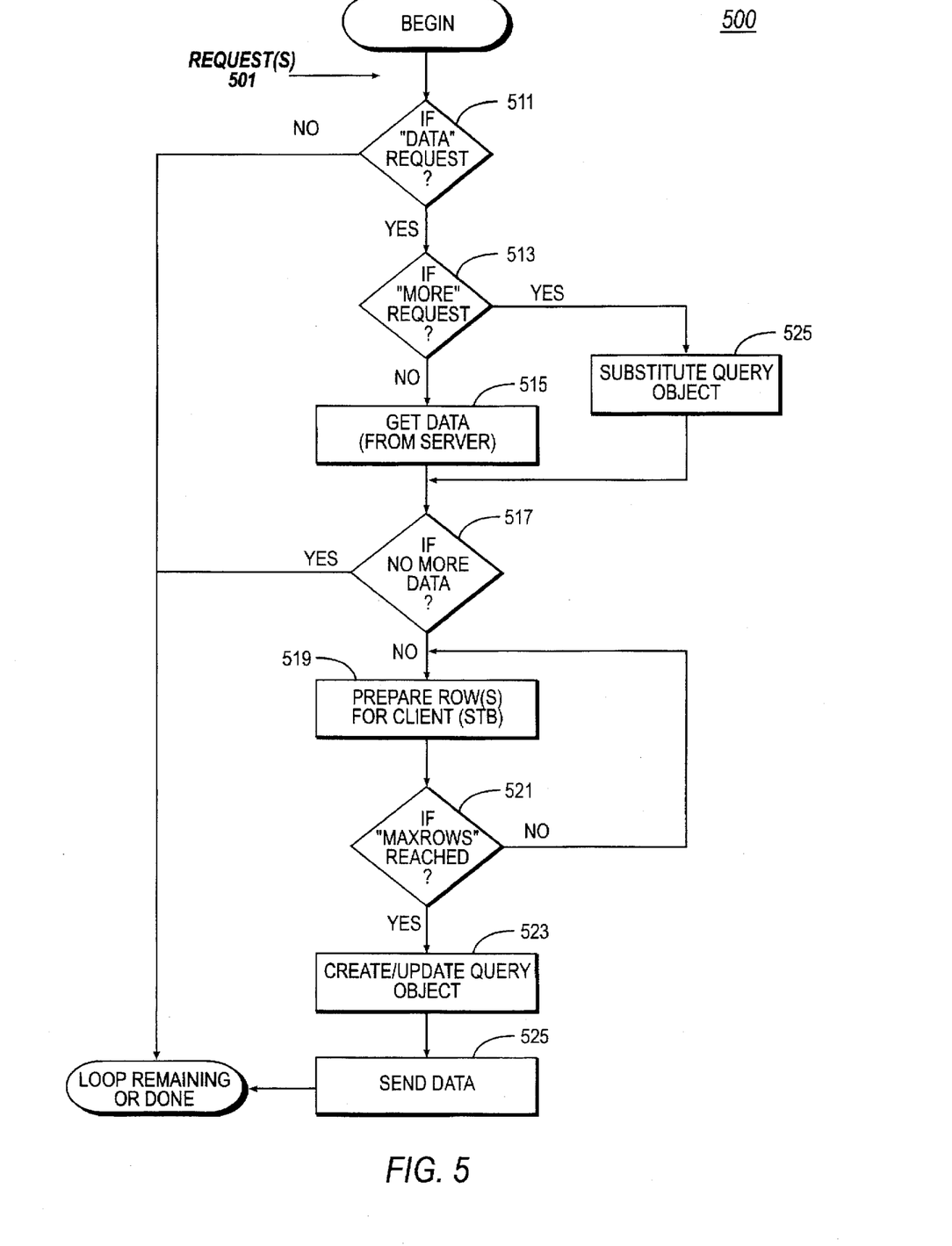
FIG. 5 is a block diagram illustrating an overall method of the present invention for fetching data from a Client/server system, in accordance with the present invention.

Internal operation of the system of the present invention is perhaps best described by examining execution of a request which arrives at the Dispatch Server. Referring now to FIG. 5, a method 500 of the present invention for executing a client query will now be described. At the outset, a request 501 (e.g., query) is received at the Dispatch Server from a Client (e.g., set top box). The request includes a request for a certain number of rows of data; this information is maintained as MAXROWS, for the Client. At step 511, the method determines whether the request is a "data" request. A "data" request is one which the system expects to return a relatively large amount of data (e.g., rows from a database table). If the request is not a data request, the method returns; the steps necessary for servicing the non-data request are done elsewhere, in a conventional manner. A request which is not a data request includes, for example, a request to simply play a video. In this case, the Dispatch Server serves as a controller to the Media Stream Server and simply sends an "acknowledgment" to the set top boxes.

If the request is determined at step 511 to comprise a "data request," the method proceeds to step 513, for determining whether the request is for "more" data (i.e., at least some data has already been sent). For the first pass through the method, the request will not be a "more" request. Accordingly, the method proceeds to step 515 to get the data. Here, the Dispatch Server gets the data from the particular server of the system which stores the requested information, for example, invoking access methods of the Intermedia Server 331 for fetching data records.

If at least some data is present at step 517, the method "prepares" the data (e.g., table rows) for the Client (e.g., set top box), at step 519. In a preferred embodiment, the data is prepared by placing it in format for sending to the Client, such as Sybase Multimedia Messaging Library (MML) format. This effectively places the data in a container or packet suitable for transmission across a wire. After this step, the method proceeds to step 519, for checking whether any more data remain.

At step 521, the method checks whether MAXROWS has been reached (i.e., whether the data to be transmitted has reached the maximum number of permissible rows). Recall from request 501 that MAXROWS is preferably client specified. If the answer to the determination at step 521 is "no," the method loops back to step 519 for preparing more data. If, on the other hand, MAXROWS has been realized, the method goes to step 523. At that step, the method preserves the context of the current query by creating a "query object" —a data structure storing the context of the query. In conjunction with this operation, the method suspends the current query thread, thereby keeping the context of the data within the query object of that thread.

The query object itself comprises a linked list of records or C "structs"; embedded within each is a query statement. The query object, therefore, comprises an SQL or SQL-like query having a context (i.e., descriptor information) and ownership (i.e., thread). The linked list itself comprises a linked list of queries, thereby providing multiple queries within a single object. Recall in the environment of ITV, multiple queries from a client are common. For instance, an end user at a set top box might wish to see two scrolling lists: one for movies, another for actors. Thus, any given set top box might have multiple potential queries open at a given instance.

Actual data is transmitted at step 525. Here, a number of rows less than or equal to MAXROWS is transmitted to the Client. While requests remain outstanding, the method 500 loops. On subsequent passes, the method will encounter queries for which it has already sent some data. These queries, on their subsequent pass through the method, request "more" data. At step 513, the system determines whether the data request is a "more" type of request. A "more" request is a request which occurs subsequent to the initial request for data. If the request is a "more" request, the method proceeds to step 525 to substitute the query object for this data. Thereafter, the method proceeds to step 517. From there, the method repeats step 519 (for preparing data) and subsequent steps, continuing in this manner until the method is done. Note, however, that if the query object is already created when the method reaches step 523, a subsequent query object is not created. In other words, the query object is only created during the first pass through the method (for instances where "more" data remains).

B. System states

Figure 6:
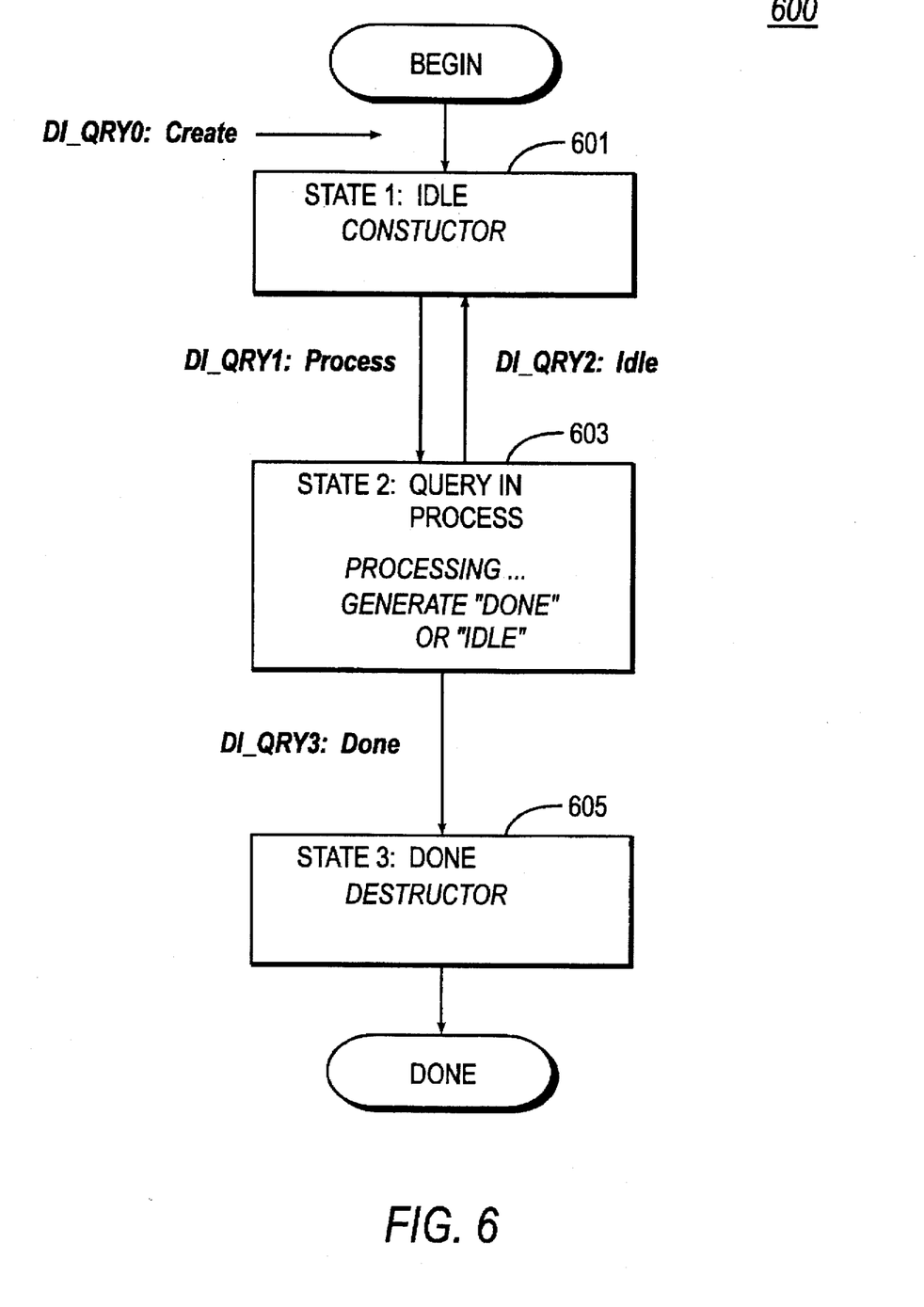
FIG. 6 is a state diagram illustrating states of the system of the present invention during operation of the method set forth in FIG. 5.

FIG. 6 illustrates a state diagram of the system which represents states of the system during operation of the method 500 of FIG. 5, with particular emphasis on the processing of a query. The system enters state 1 ("idle" box 601) for a query, upon receipt of a query message, DI_QRY0: Create. The query includes, at the outset, a "process" event for transforming the system into state 2 on that query (i.e., get more data), after invoking the constructor of state 1. Here, the "process" event (DI_QRY1: Process query message) transforms the system from state 1 (create/idle) to state 2 (query in process). "Process" (i.e., "process the query") is a named event indicating that the system should process the query. In effect, this serves as a message which is dispatched to an appropriate handler, for carrying out the functionality of processing the query. The message itself includes context information.

In state 2 ("query in process" box 603), the system continues to send rows to the Client, while "end of results" has not been reached—that is, while more data remains. When end of result is reached, however, the process generates a DI_QRY3: Done query to "self" (i.e., it posts a "done" message to itself). In the event that the process posts a done message to itself, the system enters state 3 ("done" box 605) for that query. Here, the process invokes its destructor for performing any necessary clean up operation (e.g., de-allocating memory for the query object). Specifically, the thread which holds the context (i.e., query thread) is cleaned up by the destructor, upon completion of the query. Otherwise, the process may post an "idle" message (DI_QRY2: Idle) to "self" and, therefore, send the system back to state 1 for the query. Context of the query, at this time, is maintained within the query object for the query thread associated with the query. In state 1, the system awaits a "more" request, before processing remaining data.

C. Data structures

In an exemplary embodiment, a query object may be constructed as follows (using the C programming language).

```
1:  /*
2:  ** Object: DI_QRY — Query
3:  **
4:  ** Color: red
5:  **
6:  ** Denormalization: None
7:  */
8:  typedef struct di_qry
9:  {
10:     CS_INT          arr_pntr;
11:
12:     CS_INT          di_sess_next;
13:
14:
15:     CS_INT          query_id;
16:     CS_CONNECTION   *connect;
17:     CS_COMMAND      *cmd;
18:     /* Refers to session */
19:     CS_INT          session_id;
20:     CS_INT          request_id;
21:     CS_SMALLINT     current_state;
22: } DI_QRY_T;
```

The query object, DI_QRY_T, defines a currently-pending query. The first data member, arr_pntr, at line 10, is an array employed for maintaining a list of query objects. Here, the data member points to "self" and, thus, allows the system to easily determine the in-memory address for this query object (among a plurality of query objects). The next data structure, di_sess_next, serves as a shorthand way of linking together multiple open queries in a session. A session will have a pointer pointing to a "first" query. Each query, in turn, will have pointers to subsequent queries. Here, integers are used to point to members in the array. The query_id, at line 15, is a unique number for the query object. In the currently-preferred embodiment, it is set equal to the array pointer (arr_pntr), that is, a particular position in the array. The query_id serves as a placeholder for implementations which do not employ an array of query objects.

The *connect data member, at line 16, is a pointer to a Sybase CT Lib data structure, defining a database (server) connection. This and other CT Lib data structures are documented in *Open Client™ Client-Library/C Reference Manual*, Sybase Document ID 32840-01-1000-04 (available from Sybase, Inc. of Emeryville, Calif.), the disclosure of which is hereby incorporated by reference. The *cmd data structure, at line 17, is a pointer to a Sybase CT Lib "command" data structure. Together, the *connect and *cmd data structures provide the full context of the query. Specifically, the two contain everything that is known about a thread executing a query. The method of the present invention is itself a "pass through" for the query information. In other words, the method is generic and is not concerned about the particular context of the query. Instead, it simply preserves the context of the query, whatever it is, so that when execution of the query continues the server can reference the context for carrying out appropriate action.

The next two data members are the session_id, at line 19, and the request_id, at line 20. The session_id uniquely identifies who (e.g., what set top box) initially submitted the query. The request_id data member, on the other hand, is the internal handle from the requestor itself (which might have several requests simultaneously open). Finally, the current_state data member, at line 21, defines the current state for the system. As previously described, this is either state 1, state 2, or state 3.

D. Implementation of methods for the states

1. State 1

The method for processing state 1, that is the "idle" state, may be constructed as follows (using the well-known C programming language).

```
1:  /*******************************************************
2:
3:  Object: DI_QRY — Query
4:     Action for state 1 — Idle
5:
6:  *******************************************************/
7:
8:  CS_RETCODE      ims_di_qry_action_1 (
9:      workerp,
10:     self,
11:     ev_ih_sesr,
12:     ims_event_id,
13:     trace)
14: DP_WORKER        *workerp;
15: DI_QRY_T         *self;
16: DI_SESR_T        *ev_ih_sesr;
17: CS_INT           *ims_event_id;
18: CS_INT           trace;
19: {
20:     CS_RETCODE   retcode = CS_SUCCEED;
21:     /*
22:     ** Query is born and/or in idle.
23:     **
24:     */
25:     return(retcode);
26: }
```
(line numbers added to aid in description)

As shown within the body of the function (i.e., between lines 19 and 26), the method essentially does no work; it simply serves as an "idle." No other work is performed other than returning a "success" code.

2. State 2

In an exemplary embodiment, a method for processing state 2 can be constructed as follows.

```
1:  /*******************************************************
2:
3:  Object: DI_QRY — Query
4:     Action for state 2 — Query in process
5:
6:  *******************************************************/
7:
8:  CS_RETCODE    ims_di_qry_action_2 (
9:      workerp,
10:     self,
11:     ev_ih_sesr,
12:     ims_event_id,
```

```
13:         trace)
14: DP_WORKER      *workerp;
15: DI_QRY_T       *self;
16: DI_SESR_T      *ev_ih_sesr;
17: CS_INT         *ims_event_id;
18: CS_INT         trace;
19: {
20:         CS_RETCODE      retcode = CS_SUCCEED;
21:         MML_DATAITEM    *outparamsp = NULL;
22:         MML_DATAITEM    *responsep = NULL;
23:         CS_COMMAND      *save_cmd;
24:         CS_CONNECTION   *save_connect;
25:         CS_INT          moreStat = IMS_IN_MORE;
26:         DI_SESS_T       *ih_sess;    /* used to find sessoidp*/
27:
28:         /*
29:         ** Put the pending results connection back into the worker
30:         ** thread, temporarily.
31:         */
32:         save_cmd = workerp—>w_cmdp;
33:         save_connect = workerp—>w_connp;
34:         workerp—>w_cmdp = self—>cmd;
35:         workerp—>w_connp = self—>connect;
36:
37:
38:         /*
39:         ** Get sessoidp for later.
40:         */
41:         ih_sess = ims_select_di_sess(workerp—>w_sessid);
42:
43:         retcode = dp_sendSqlEvent( workerp,
44:                 ev_ih_sesr,
45:                 "ImcMoreData",
46:                 NULL,
47:                 &outparamsp,
48:                 &responsep,
49:                 &moreStat );
50:
51:         /*
52:         ** if all is ok, send this stuff off to the IMC !
53:         */
54:         if ( retcode == CS_SUCCEED )
55:                 {
56:                         IMCVP_LOG(IVP_MSGT_IMCOUTPAR,
57:                             "Outgoing Row Data to IMC:");
58:                         IMOS_LOG_DATAITEMS(ImcVpSubid,
59:                             IVP_MSGT_IMCOUTPAR, responsep);
60:
61:                         VpL2PassThru ((CS_VOID *) NULL,
62:                             ih_sess—>sessoidp, responsep, 0 );
63:                         /* Note: MML srv_frees responsep */
64:
65:                 }
66:         else
67:                 {
68:                         /* Notify IMC of failure */
69:                         ims_send_quick_resp( workerp, ev_ih_sesr—>request_type,
70:                             ev_ih_sesr—>request_id, ev_ih_sesr—>session_id,
71:                             imcFAIL, "IMS internal error" , 0);
72:                 }
73:
74:         /*
75:         ** Note that a response has been sent
76:         */
77:
78:
79:         /*
80:         ** Restore the worker thread's connection.
81:         */
82:         workerp—>w_cmdp = save_cmd;
83:         workerp—>w_connp = save_connect;
84:
85:         /*
86:         ** Determine whether we are done with this result set
87:         ** or should we keep it around.
88:         */
89:         if (moreStat == IMS_REACHED_MAXROWS)
90:                 {
91:                         /* we hit maxrows so keep qry open*/
92:                         *ims_event_id = DI_QRY_EV_IDLE;
```

```
 93:        }
 94:        else
 95:        {
 96:            /* qry must be done */
 97:            *ims_event_id = DI_QRY_EV_DONE;
 98:        }
 99:
100:        if (outparamsp)
101:        {
102:            imcomn_free_dataitems(outparamsp);
103:        }
104:        outparamsp = NULL;
105:
106:        if (responsep)
107:        {
108:            imcomn_free_dataitems(responsep);
109:        }
110:        responsep = NULL;
111:
112:        return(retcode);
113:    }
```

This method is the workhorse routine; it handles the task of re-associating worker threads with query threads. As shown, the method is passed five parameters. The first parameter, workerp, is a pointer to a worker thread which is invoking the method. The second parameter, self, is a pointer to itself—the query object itself. The self pointer is a pointer to a particular location in the query object array (i.e., the array position for this query object).

The third parameter, ev_ih_sesr, is a session request handle. This parameter specifies the type of fetch request; it is typically set to "more." The fourth parameter, ims_event_id, serves as the event ID for the event coming into the object. Typically, the incoming event is "processed" (i.e., go to state 2). The outgoing event, on the other hand, is typically either go to state 1 (i.e., idle) or go to state 3 (i.e., done). Since this parameter is passed by reference, it can be used to both send and receive information. The final parameter, trace, is used for debug information. It simply serves for housekeeping and, thus, it is not necessary for understanding the method.

At the outset, the method "holds onto" the context of the database or query thread associated with the worker thread, at lines 32–33. At lines 34–35, the method takes the query context which was held (previously) and associates it with the worker thread. At line 41, the method obtains a session handle for the current request (i.e., housekeeping), in preparation for the call at line 43 to dp_sendSqlEvent. The actual call to dp_sendSqlEvent, at line 43, processes the query. This subroutine serves as a generic SQL handler. The handler is responsible for packaging the query and also for testing whether MAXROWS has been sent. The fourth parameter to this handler, moreStat (at line 49), serves as a boolean for indicating whether more data remains to be sent.

If the query is processed without error, the method then logs the action and sends the data back to the Client (set top box), using VpL2PassThru, at line 61. If, on the other hand, a failure occurred during the query, the method sends out an error message, as shown by the "else" statement of lines 66–72.

Continuing onto line 82, the method restores the worker thread's data context, which was held in abeyance. Specifically, the cmd pointer is copied at line 82, followed by the connect pointer at line 83. Next, the method determines whether the query should be kept open. Specifically, at line 89, it tests whether MAXROWS have been reached. If MAXROWS have been reached (i.e., "true" at line 89), then more data remains, so the query should be kept open. In such an instance, the method sets the event ID (i.e., *ims_event_id) to "idle," as shown at line 92. Otherwise (i.e., MAXROWS was not reached), the query is done. In this case, the event ID can be set to "done," as shown at line 97. The remaining steps perform clean up, freeing up data items. Finally, the method concludes by returning a "return code," as shown at line 112. The return code, recall, is the result obtained from the SQL handler.

3. State 3

In an exemplary embodiment, a method for processing state 3 may be constructed as follows.

```
 1: /**********************************************************************
 2:
 3: Object: DI_QRY — Query
 4:     Action for state 3 — Done
 5:
 6: **********************************************************************/
 7:
 8: CS_RETCODE      ims_di_qry_action_3 (
 9:     workerp,
10:     self,
11:     ev_ih_sesr,
12:     ims_event_id,
13:     trace)
14: DP_WORKER       *workerp;
15: DI_QRY_T        *self;
16: DI_SESR_T       *ev_ih_sesr;
17: CS_INT          *ims_event_id;
```

-continued

```
18:     CS_INT              trace;
19:  {
20:     CS_RETCODE          retcode = CS_SUCCEED;
21:     CS_CHAR             msgbuf[CS_MAX_MSG];
22:
23:     /*
24:     ** Delete query (Note: drops connection )
25:     **
26:     */
27:
28:     (void) ct_cancel((CS_CONNECTION *)NULL, self—>cmd, CS_CANCEL_ALL);
29:     (void) ct_cmd_drop(workerp—>w_cmdp);
30:
31:     ct_close(self—>connect, CS_UNUSED);
32:     ct_con_drop(self—>connect);
33:     /* invoke destructor */
34:     retcode = ims_delete_di_qry(self);
35:
36:     return(retcode);
37:  }
```

The parameters passed to the method are the same as those previously described. At lines 28–29, the method deletes the query by canceling the connection (line 28) and dropping the command (cmd) of the worker thread. The interface for both ct_cancel and ct_cmd_drop are documented in the above-described Sybase Client Library documentation. The two subroutine calls serve to cancel any existing query on the thread and drop the accompanying command (cmd) structure. To complete the close down, the method, at line 31, "closes" the connection and, at line 32, "drops" the connection. Finally, the method invokes the destructor for the query object, at line 34. The return code from this call is then returned by the method at line 36.

Appended herewith as Appendix A are source listings demonstrating exemplary utilities for processing query objects, including selecting, inserting, and deleting query objects. These comprise housekeeping utilities for managing query objects. Originally appended herewith as Appendix B are portions of the *Sybase Open Client Client-Library/C Reference Manual* describing ct_* API calls, now canceled for convenience of patent publication, the disclosure of which is hereby incorporated by reference.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

```
/*************************************************************
** Select, Insert, Delete processing for di_qry
   Copyright © 1995 Sybase, Inc.
**************************************************************/
DI_QRY_T *ims_select_di_qry ( query_id )
CS_INT          query_id;
{
    DI_QRY_T    *self;
    if ( query_id <= 0 ||
         query_id >= DI_QRY_COUNT )
    {
        CS_CHAR     errbuf[CS_MAX_CHAR * 2];
        SPRINTF(errbuf, "Id %ld is not in valid range",
                query_id);
        IMOS_ERROR((SRV_PROC *)NULL, SRV_INFO,
            errbuf);
        return ( NULL );
```

APPENDIX A-continued

```
    }
    self = &di_qry_base[query_id];
    return(self);
}
DI_QRY_T *ims_insert_di_qry ()
{
    CS_INT          arr_pntr;
    DI_QRY_T        *self;
    arr_pntr = di_qry_base[0].arr_pntr;
    if (arr_pntr == 0)
    {
            IMOS_LOGERR(
                "No room for object insert request: di_qry");
            return(0);     /* no room in the inn*/
    }
    else
    {
            self = &di_qry_base[arr_pntr];
            di_qry_base[0].arr_pntr = self—>arr_pntr;
            self—>arr_pntr = arr_pntr;
            self—>query_id = arr_pntr;
            return(self);
    }
}
DI_QRY_T
*ims_new_di_qry(connect,cmd,session_id,request_id,current_state)
CS_INT      *connect;
CS_INT      *cmd;
CS_INT      *session_id;
CS_INT      *request_id;
CS_SMALLINT *current_state;
{
    DI_QRY_T    *self;
    self = ims_insert_di_qry();
    if (self == NULL)
    {
            return(self);
    }
    if (connect != NULL)
    {
            MEMCOPY(connect, &self—>connect,
    CS_SIZEOF(CS_INT));
    }
    if (cmd != NULL)
    {
            MEMCOPY(cmd, &self—>cmd, CS_SIZEOF(CS_INT));
    }
    if (session_id != NULL)
    {
            MEMCOPY(session_id, &self—>session_id,
    CS_SIZEOF(CS_INT));
    }
    if (request_id != NULL)
```

APPENDIX A-continued

```
{
        MEMCOPY(request_id, &self->request_id,
CS_SIZEOF(CS_INT));
}
if (current_state != NULL)
{
        MEMCOPY(current_state, &self->current_state,
CS_SIZEOF(CS_SMALLINT));
}
if ( session_id != NULL )
{
        (void)ims_di_qry_formalize_di_sess( self, *session_id );
}
return(self);
}
CS_RETCODE CS_PUBLIC
ims_di_qry_formalize_di_sess( di_qry, session_id )
DI_QRY_T    *di_qry;
CS_INT      session_id;
{
    CS_RETCODE  retval = CS_SUCCEED;
    DI_SESS_T   *di_sess;
    /*
    ** Update the list of instances representing the one-to-many
    ** relationship between this object and the DI_SESS
    ** object
    */
    /*
    ** Get the related instance.
    */
    di_sess = ims_select_di_sess( session_id );
    /*
    ** Update the list head in the related instance.
    */
    if ( di_sess != NULL )
    {
            di_qry->di_sess_next = di_sess->di_qry_head;
            di_sess->di_qry_head = di_qry->query_id;
    }
    else
    {
            di_qry->di_sess_next = 0;
    }
    return retval;
}
CS_RETCODE  ims_delete_di_qry(self)
DI_QRY_T    *self;
{
    CS_INT          arr_pntr;
    if ( self == NULL )
    {
            return CS_SUCCEED;
    }
    {
    /*
    ** Remove myself from the many list for the DI_SESS
    ** one-to-many relationship
    */
    DI_QRY_T    *di_qry = self;
    DI_SESS_T   *di_sess;
    DI_QRY_T    *di_qry_p;
    CS_INT      head;
    di_sess = ims_select_di_sess( self->session_id );
    if ( di_sess != NULL )
    {
            if ( di_sess->di_qry_head == di_qry->arr_pntr )
            {
                    di_sess->di_qry_head =
                        di_qry->di_sess_next;
            }
            else
            {
                    head = di_sess->di_qry_head;
                    /*
                    ** Follow down the train; find self; delete self
                    ** from link
                    */
                    for ( di_qry_p = &di_qry_base[head] ;
                        di_qry_p->di_sess_next != 0 ;
```

APPENDIX A-continued

```
                        di_qry_p =
                            &di_qry_base[di_qry_p->di_sess_next] )
                    {
                            if ( di_qry_p->di_sess_next
                                == di_qry->arr_pntr )
                            {
                                    di_qry_p->di_sess_next =
                                        di_qry->di_sess_next;
                                    break;
                            }
                    }/* end for */
            }/* end if */
    }/* end if di_sess != NULL */
    }
    arr_pntr = self->arr_pntr;
    srv_bzero(self, sizeof(DI_QRY_T));
    self->arr_pntr = di_qry_base[0].arr_pntr;
    di_qry_base[0].arr_pntr = arr_pntr;
    return(CS_SUCCEED);
}
```

What is claimed is:

1. In a client/server system comprising at least one client connected via a network to a server, a method for sending information from the server to a particular client, the method comprising:

receiving a request from the particular client for information of interest, said request specifying a maximum amount of information that can be received by said particular client at one time;

while the maximum amount of the information that can be received by said particular client has not been reached, retrieving some amount of the information for sending to the particular client;

if the maximum amount of the information that can be received by said particular client has been reached while more of the information remains for said request, storing data describing a context for the request, said context storing information at the server describing said request for information of interest to the particular client, the maximum amount of information that can be received by said particular client at one time, and how much information has already been retrieved by the particular client, for facilitating processing of subsequent requests by the particular client for retrieving additional portions of the information of interest which have yet to be retrieved by the particular client; and sending to the client the information retrieved in response to said request and any subsequent requests.

2. The method of claim 1, wherein said request comprises a query specifying a query condition.

3. The method of claim 2, wherein said query is an SQL query.

4. The method of claim 1, wherein said particular client is a set top box.

5. The method of claim 1, wherein said information of interest comprises particular rows from a database table stored on the server.

6. The method of claim 1, wherein said maximum amount of information is specified as a maximum number of rows that said particular client can receive.

7. The method of claim 1, wherein said maximum amount of information is specified as a maximum number of bytes that said particular client can receive.

8. The method of claim 1, wherein said data describing the context for the request comprises a query object characterizing a query in process, said query object including information sufficient to characterize said request specifying the information of interest to the particular client.

9. The method of claim 8, wherein said query object comprises a database query and information describing how much information has been sent to the particular client.

10. The method of claim 8, wherein said query object is maintained on a thread of execution separate from a worker thread of execution employed for processing the request.

11. The method of claim 1, further comprising:
receiving another request for more information, and repeating the retrieving step.

12. The method of claim 1, wherein said particular client is a set top box and said request comprises a request for a listing of services available to a user of the system.

13. The method of claim 1, wherein said maximum amount of information comprises about 25 to 300 rows of information from a database table.

14. The method of claim 1, wherein said information of interest comprises rows of information taken from a plurality of database tables.

15. The method of claim 1, wherein said context for the request is preserved by a separately executing thread.

16. The method of claim 15, wherein said request comprises a query and wherein said separately executing thread "sleeps" during periods of time when the query remains open yet information is not being currently sent to the particular client.

17. In a database system comprising at least one client connected via a network to at least one server, a method for processing a query from a particular client, said query specifying fetching of data records, the method comprising:
receiving an initial request comprising a query from the particular client for fetching data records, said query specifying a query condition which data records must meet in order to be fetched, said client able to receive a maximum number of data records at one time;
fetching data records meeting said query condition;
sending to the particular client an initial set of data records from said fetched data records, said initial set having a number of data records equal to or less than said maximum number of data records;
suspending processing of the query until a subsequent request for more data records satisfying the query is received from the particular client, said suspending step maintaining information describing the query in process;
receiving such a subsequent request from the particular client for more data records; and sending to the particular client a subsequent set of data records from said fetched data records, said subsequent set having a number of data records equal to or less than said maximum number of data records.

18. The method of claim 17, wherein said query comprises an SQL statement.

19. The method of claim 17, wherein said data records are stored in a database table of a particular server.

20. The method of claim 17, wherein said data records are derived from a plurality of database tables.

21. The method of claim 17, wherein said maximum number of data records specified by the particular client is determined based on memory available at the particular client.

22. The method of claim 21, wherein said memory available at the particular client comprises memory ranging from four megabytes to eight megabytes of random-access memory.

23. The method of claim 17, wherein said initial request for more data records comprises an SQL statement.

24. The method of claim 17, wherein said maximum number of data records numbers about 25 to 300 data records.

25. The method of claim 17, wherein said information describing said query includes information describing the query condition, information describing a connection between said particular client and a particular server, and information describing how many data records had been sent to said particular client.

26. The method of claim 17, wherein said suspending step includes suspending execution of a thread which holds said information describing said query.

27. The method of claim 26, wherein said thread which holds said information describing said query is separate from a thread employed for processing said query.

28. The method of claim 27, wherein said thread employed for processing said query condition executes processing for another query, upon suspending execution of the thread which holds said information describing said query.

29. The method of claim 17, further comprising sending a command from the particular client to the particular server for terminating processing of the query.

30. The method of claim 29, wherein said command to terminate processing of said query can be sent by the particular client at any time during query processing.

* * * * *